United States Patent
Li et al.

(10) Patent No.: US 9,854,221 B2
(45) Date of Patent: Dec. 26, 2017

(54) HYPERSPECTRAL IMAGING DEVICES USING HYBRID VECTOR AND TENSOR PROCESSING

(71) Applicant: Xerox Corporation, Norwalk, CT (US)

(72) Inventors: Qun Li, Webster, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 645 days.

(21) Appl. No.: 14/498,255

(22) Filed: Sep. 26, 2014

(65) Prior Publication Data

US 2016/0094827 A1 Mar. 31, 2016

(51) Int. Cl.
- *H04N 13/00* (2006.01)
- *H04N 5/33* (2006.01)
- *H04N 13/02* (2006.01)
- *H04N 5/232* (2006.01)

(52) U.S. Cl.
CPC ..... *H04N 13/0007* (2013.01); *H04N 5/23245* (2013.01); *H04N 5/332* (2013.01); *H04N 13/0203* (2013.01); *H04N 13/0296* (2013.01)

(58) Field of Classification Search
CPC ........... H04N 13/0007; H04N 5/23245; H04N 5/332; H04N 13/0203; H04N 13/0296
See application file for complete search history.

(56) References Cited

U.S. PATENT DOCUMENTS

| | | | |
|---|---|---|---|
| 5,513,128 A | 4/1996 | Rao | |
| 8,570,442 B2 | 10/2013 | Mestha et al. | |
| 2012/0063641 A1 | 3/2012 | Venkatesh et al. | |
| 2013/0128042 A1* | 5/2013 | Bridge | H04N 5/232 348/143 |

FOREIGN PATENT DOCUMENTS

| | | |
|---|---|---|
| CN | 101893552 | 11/2010 |
| CN | 102750714 | 10/2012 |

OTHER PUBLICATIONS

Li et al, "Generalized Tensor Compressive Sensing," Jul. 2013, Multimedia and Expo (ICME), 2013 IEEE International Conference on, 7 pages.*

(Continued)

*Primary Examiner* — David F Dunphy
(74) *Attorney, Agent, or Firm* — Gibb & Riley, LLC

(57) ABSTRACT

Methods and systems obtain data representative of a scene across spectral bands using a compressive-sensing-based hyperspectral imaging system comprising optical elements. These methods and systems sample two modes of a three-dimensional tensor corresponding to a hyperspectral representation of the scene using sampling matrices, one for each of the two modes, to generate a modified three-dimensional tensor. After sampling the two modes, such methods and systems sample a third mode of the modified three-dimensional tensor using a third sampling matrix to generate a further modified three-dimensional tensor. Then, the methods and systems reconstruct hyperspectral data from the further modified three-dimensional tensor using the sampling matrices and the third sampling matrix.

16 Claims, 5 Drawing Sheets

(56) References Cited

OTHER PUBLICATIONS

Duarte et al., "Kronecker Compressive Sensing," Image Processing, IEEE Transactions on , vol. 21, No. 2, Feb. 2012, pp. 1-26.
Sidiropoulos et al., "Multi-Way Compressed Sensing for Sparse Low-Rank Tensors," Signal Processing Letters, IEEE , vol. 19, No. 11, Nov. 2012, pp. 757-760.
Qun Li et al., "Generalized tensor compressive sensing," Multimedia and Expo (ICME), 2013 IEEE International Conference , Jul. 2013, pp. 1-6.
Nischan et al., "Analysis of HYDICE Noise Characteristics and Their Impact on Subpixel Object Detection", Part of the SPIE Conference on Imaging Spectrometry V • Denver, Colorado • Jul. 1999 112 SPIE vol. 3753, pp. 112-123.
Shmuel Friedland et al.,"Two Algorithms for Compressed Sensing of Sparse Tensors", http://arxiv.org/bs /1404.1506v1, Apr. 5, 2014, pp. 1-23.

\* cited by examiner

HYPERSPECTRAL IMAGING DEVICES USING HYBRID VECTOR AND TENSOR PROCESSING

BACKGROUND

Systems and methods herein generally relate to sophisticated imaging systems, such as multispectral and hyperspectral imaging systems and methods that process such images to produce hyperspectral cubes.

Consumer digital cameras in the megapixel range are commonplace due to the fact that silicon, the semiconductor material of choice for large-scale electronics integration, readily converts photons at visual wavelengths into electrons. On the other hand, imaging outside the visible wavelength range is considerably more expensive.

Multispectral imaging collects and processes electromagnetic information at discrete and somewhat narrow bands of different wavelengths. Hyperspectral processes image narrow spectral bands over a continuous spectral range, and produce the spectra of all pixels in the range. Such imaging is useful for medical/healthcare imaging (e.g., human vitals monitoring), transportation (e.g., occupancy detection and remote vehicular emissions monitoring), to find objects, identify materials, or detect processes. Hyperspectral and multispectral imaging have a wide range of applications including astronomy, mineralogy, surveillance, biomedical imaging, physics, and agriculture. However, such imaging systems are bulky, expensive and relatively slow.

SUMMARY

Some exemplary methods herein obtain data representative of a scene across spectral bands using a compressive-sensing-based hyperspectral imaging system. The imaging system includes, among other components, optical elements and a special-purpose image processor. These methods sample two modes of a three-dimensional tensor corresponding to a hyperspectral representation of the scene using the same or different sampling matrices, one for each of the two modes, to generate a modified three-dimensional tensor. With such methods, the process of sampling the two modes is performed by measuring light intensity, and resulting samples are represented by digital data.

After sampling the two modes, these exemplary methods sample a third mode of the modified three-dimensional tensor using a third sampling matrix to generate a further modified three-dimensional tensor. These methods sample the third mode by processing the digital data produced by sampling the first two modes.

Then these methods can reconstruct hyperspectral data from the further modified three-dimensional tensor using the same three matrices used for the three modes (the first two sampling matrices and the third sampling matrix). More specifically, when reconstructing the hyperspectral data to create a hyperspectral cube, such methods recover each mode of the three-dimensional tensor via a sequence of optimization processing in the reverse order that the first two modes and the third mode were sampled.

Thus, when processing the reconstruction in the reverse order, these methods perform a sequence that first applies an optimization process (a vectorial optimization on the third mode) to the further modified three-dimensional tensor to reconstruct the modified three-dimensional tensor as a recovered modified three-dimensional tensor. Then, after performing the vectorial optimization on the third mode, the reverse order sequence applies a different optimization process (a joint tensorial or a single vectorial optimization on the first two modes) to the recovered modified three-dimensional tensor to reconstruct the three-dimensional tensor corresponding to the hyperspectral representation of the scene.

Other methods herein similarly obtain data representative of a scene across spectral bands using a compressive-sensing-based hyperspectral imaging system comprising optical elements. These methods sample two modes (two dimensions) of a three-dimensional tensor corresponding to a hyperspectral representation of the scene using the compressive-sensing-based hyperspectral imaging system, to generate a modified three-dimensional tensor. Again, with the methods, the process of sampling the first two modes is performed by measuring light intensity, and resulting samples are represented by digital data.

Then, after sampling the first two modes, such methods sample a third mode (third dimension) of the modified three-dimensional tensor, potentially using an external processor separate from the compressive-sensing-based hyperspectral imaging system to generate a further modified three-dimensional tensor. Each matrix that samples each mode (dimension) may be the same or may be different from the other matrices. These methods sample the third mode by processing the digital data from sampling the first two modes. Then, these methods reconstruct hyperspectral data from the further modified three-dimensional tensor using the external processor. In a similar process, when reconstructing the hyperspectral data, such methods recover each mode of the three-dimensional tensor via a sequence of optimization processing in the reverse order that the two modes and the third mode were sampled.

As noted above, when processing the reconstruction in the reverse order, these methods perform a sequence that first applies an optimization process (a vectorial optimization on the third mode) to the further modified three-dimensional tensor to reconstruct the modified three-dimensional tensor as a recovered modified three-dimensional tensor. Then, after performing the vectorial optimization on the third mode, the reverse order sequence applies a different optimization process (a joint tensorial or a single vectorial optimization on the first two modes) to the recovered modified three-dimensional tensor to reconstruct the three-dimensional tensor corresponding to the hyperspectral representation of the scene.

Various systems herein comprise a compressive-sensing-based hyperspectral imaging system that includes, but is not limited to optical elements that obtain data representative of a scene and a special-purpose image processor. The special-purpose image processor contains specialized circuitry used exclusively for image processing (such as special logic circuits, application specific integrated circuits (ASIC's), special filters, buffers, etc.) that distinguishes the special-purpose image processor from a general purpose processor. In addition, an external processor (that can be a general purpose processor) is separate from and operatively (meaning directly or indirectly) connected to the compressive-sensing-based hyperspectral imaging system.

The compressive-sensing-based hyperspectral imaging system samples the first two modes (two dimensions) of a three-dimensional tensor corresponding to a hyperspectral representation of the scene using the same or different sampling matrices, one matrix for each of the two modes, to generate a modified three-dimensional tensor. In some situations, the special-purpose image processor can output the modified three-dimensional tensor to the external processor.

Then, after the compressive-sensing-based hyperspectral imaging system samples two modes, the external processor (or the special-purpose image processor, if the modified three-dimensional tensor is not output) samples a third mode (third dimension) of the modified three-dimensional tensor using a third sampling matrix (that may be the same or different from the other two matrices used to sample the first two modes) to generate a further modified three-dimensional tensor. The compressive-sensing-based hyperspectral imaging system the two modes by measuring light intensity, and resulting samples are represented by digital data. The external processor (or the special-purpose image processor) samples the third mode by processing the digital data produced by sampling the first two modes.

The external processor (or the special-purpose image processor) then reconstructs hyperspectral data from the further modified three-dimensional tensor using the same three matrices used for the three modes (the sampling matrices and the third sampling matrix). The external processor reconstructs hyperspectral data by recovering each mode of the three-dimensional tensor via a sequence of optimization processing performed in the reverse order of the sampling of the two modes and the third mode.

Again, when processing the reconstruction in the reverse order, these systems perform a sequence that first applies an optimization process (a vectorial optimization on the third mode) to the further modified three-dimensional tensor to reconstruct the modified three-dimensional tensor as a recovered modified three-dimensional tensor. Then, after performing the vectorial optimization on the third mode, the reverse order sequence applies a different optimization process (a joint tensorial or a single vectorial optimization on the first two modes) to the recovered modified three-dimensional tensor to reconstruct the three-dimensional tensor corresponding to the hyperspectral representation of the scene.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
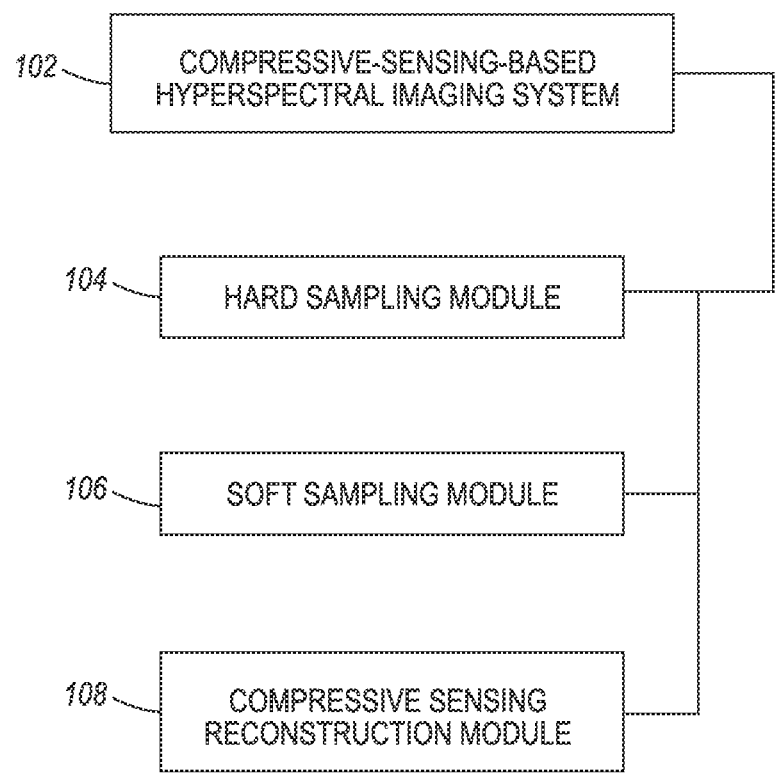
FIG. 1 is a schematic diagram illustrating devices herein.

As mentioned above, hyperspectral and multispectral imaging have a wide range of applications; however, such imaging systems are bulky, expensive, and relatively slow. Single pixel imaging systems provide significant cost savings, yet obtaining a broad spectral response from single pixel imaging systems can create a somewhat more complex optical path requiring additional splitters, lenses, mirrors, and filters, and involve compressive sensing reconstruction to multi-band imaging, which can be inefficient and expensive.

Therefore, the systems and methods herein provide multi-band hyperspectral image reconstruction that is a hybrid between traditional vectorial and tensorial compressive sensing reconstruction techniques. The systems and methods herein are applicable to any compressive-sensing-based hyperspectral system, for example to hyperspectral single pixel camera devices, and provide significantly improved reconstruction efficiency.

Data acquisition can be performed by collecting massive amounts of data, after which most parts are discarded at the compression stage to facilitate storage and transmission by creating smaller files. This process of massive data acquisition followed by compression is extremely wasteful (for example, a digital camera which has a sensor with millions of imaging pixels can be used, but eventually the picture may be encoded in just a few hundred kilobytes). Compressive sensing (CS) operates very differently, and performs as if it were possible to directly acquire just the important information about the object of interest in a sparse signal. By performing random sensing, one has enough information to reconstruct the signal with accuracy. In other words, CS systems use a small number of measurements to provide data in an already compressed digital form so that one can obtain super-resolved signals (relative to the number of measurements) less expensively from just a few measurements. Further, compressive sensing senses incoherent data, and generally data is incoherent when no element of one basis has a sparse representation in terms of the other basis.

Therefore, compressive sensing takes advantage of a signal's sparsity, allowing the entire signal to be determined from relatively few measurements, and the methods and systems herein take advantage of sparsity in three dimensions (three modes) of the three-dimensional tensor that is used to represent the hyperspectral cube. By utilizing sparsity in three dimensions, fewer measurements need to be performed, and correspondingly smaller data files are produced and processed, which reduces the need for processing resources, which in turn reduces the complexity and price of the systems herein. In other words, by processing imaging data having sparsity in three dimensions, the number of measurements can be reduced, and the size of the files processed is reduced, which allows the devices that obtain and process hyperspectral images to be smaller, lighter, less expensive, etc., which saves costs and resources, and makes the user experience more enjoyable.

For purposes herein a signal is considered sparse if it contains many coefficients that are close to or equal to zero, when represented in some domain. Therefore, converting an image back into an intended domain can be performed by solving an underdetermined set of equations (because the number of compressive sensing measurements is smaller than the number of pixels in the full image) and enforcing sparsity constraints on the solution. In one embodiment, vectorial processing involves sensing and reconstructing a vector for a given pixel location, where the vector spans an array of spectral planes that make up the hyperspectral or multispectral image. In another embodiment, vectorial processing involves sensing and reconstructing a vector corresponding to a row or a column of an image on a given spectral plane. In applications involving multi-spectral systems, data is intrinsically of high-order, and thus more suitably represented in tensorial form. Tensors are multidimensional arrays, and tensorial processing therefore organizes data in the form of tensors and performs operations within the framework of multilinear algebra.

The systems and methods herein can include, among other elements, the following modules: (a) a compressive-sensing-based hyperspectral imaging system; (b) a hard sampling module that acquires samples from the scene with the compressive-sensing-based device; (c) a soft sampling module that manipulates the hard samples to create a new set of samples; and (d) a compressive sensing reconstruction module that takes the set of soft samples, as well as the known set of sampling matrices, and reconstructs the original hyperspectral data of the scene of interest by solving a minimization problem, such as a set of 10, 11, 12, etc., minimization problems.

With respect to the above terminology, "hard" data values are data values representing light intensities as acquired by optical elements, including sensors, lenses, filters, etc., and "soft" data values are data values calculated by computerized processors from such hard values using a function or process. Further, a set of "l1 minimization" (or "l1 regularization") problems (or l0 minimization, l2 minimization, etc.) are terms of art. For example, the set of l1 minimization involves analogs of the gradient descent method, or may be based on greedy algorithms. Specifically, for many problems in imaging, l1 regularization offers superior results when compared to other image processing techniques because of the edge-preserving properties it provides. Compressive sensing (CS) allows high-dimensional signals and images to be accurately reconstructed from a very small number of samples (e.g., sparse image data) typically using l1 minimization techniques.

Imaging outside the visible wavelength range is considerably more expensive relative to sensing within the visible wavelength range. It is thus of interest to find a less expensive alternative to traditional multispectral imaging solutions, particularly since current embodiments of hyperspectral imaging systems are bulky, expensive and relatively slow.

With respect to compressive sensing and the low pixel or single pixel camera, compressive sensing exploits the sparsity of a signal in order to integrate acquisition and compression. CS theory enables exact reconstruction of a sparse signal from relatively few linear measurements via a suitable nonlinear minimization process. In the context of a single pixel camera, CS can be employed to reconstruct a spatial appearance of the scene being imaged from multiple incoherent measurements. Specifically, in the case of scene image reconstruction, let x denote the N-pixel sampled and vectorized version of the image scene and let $\phi_m$ denote the m-th incoherent basis function used for sampling. Each measurement performed by the sensing stage corresponds to the inner product $y_m = \langle x, \phi_m \rangle$. The sampling basis functions $\phi_m$'s are typically generated via the use of pseudorandom number generators (e.g., Gaussian, Bernoulli, etc.) that produce patterns with close to 50% fill factor. By making the basis functions pseudorandom, the N-pixel sampled scene image x can typically be reconstructed with significantly fewer samples than those dictated by the Nyquist sampling theorem (i.e., the image can be reconstructed after M inner products or samples, where M<<N). Stacking all measurements together and expressing the measurement process as a matrix product, $y = \phi x$.

The above-described framework relies on vectorial data representation, which results in good compression ratios at the expense of increased computational complexity. This is because the N-dimensional sparse vector x is recovered by finding the solution to the following optimization task:

$$\min_x \|x\|_1 \text{ subject to } y = \phi x \qquad (1)$$

which intrinsically vectorizes the data (specifically, x is the vectorized form of the 2D scene image in Eq. (1)).

This disclosure uses boldface capital italic letters such as X to denote tensors, capital italic letters such as X to denote matrices, boldface italic letters such as x to denote vectors, and italic letters x to denote scalar as well as entry of the vector, matrix or tensor.

As noted above, and as shown in FIG. 1, the systems and methods herein can include, among other elements, the following modules: (a) a compressive-sensing-based hyperspectral imaging system 102; (b) a hard sampling module 104 that acquires samples from the scene with the compressive-sensing-based device; (c) a soft sampling module 106 that manipulates the hard samples to create a new set of soft samples; and (d) a compressive sensing reconstruction module 108 that takes the set of soft samples, as well as the known set of sampling matrices, and reconstructs the original hyperspectral data of the scene of interest by solving a set of (in one example, a set of 11) minimization problems.

The compressive-sensing-based hyperspectral imaging system 102 includes, but is not limited to a hyperspectral imaging camera that operates under a compressive sensing framework, such as a hyperspectral-capable single pixel camera, or other similar compressive-sensing based devices with hyperspectral capabilities.

With respect to the hard sampling module 104, again the term hard sample refers to samples of the scene acquired directly from the imaging system 102. The sampled hyperspectral cube represents the scene with a three-dimensional tensor $X \in \mathbb{R}^{N_r \times N_c \times N_b}$ where $N_r$ and $N_c$ are the number of rows and columns of the image, respectively, and $N_b$ is the number of bands. The row, column and spectral dimensions of the image are referred to as modes 1, 2 and 3 of the tensor, respectively. Note that while some methods require full knowledge of X in advance (and these methods are thus not suitable for real-time measurement of tensorial signals as required by a compressive sensing imaging device), the methods and systems herein operate with the limited measurements that are available with a compressive sensing device in the sequence in which they are available.

In particular, some systems are limited by having to simultaneously acquire identical samples from different bands using a unique sampling matrix at any given time. In other words, if each hyperspectral image band is considered as a separate image, let $y_{im}$ denote the m-th sample corresponding to $x_i$, the i-th band image of X; then, at the time corresponding to the acquisition of the m-th sample set, samples $y_{im} = \langle x_i, \phi_{im} \rangle$ for i=1, 2, . . . , $N_b$ are available for a fixed $\phi_m$. In particular, some methods would require simultaneous knowledge of $y_{im} = \langle x_i, \phi_{im} \rangle$ and $y_{jm} = \langle x_j, \phi_{jm} \rangle$ for $\phi_{im} \neq \phi_{jm}$, which may not be possible to obtain simultaneously with real-life devices.

Due to the hardware limitations illustrated above, the hard sampling module performs measurements across two tensorial modes of the tensor representing the hyperspectral image of the scene; this approach is realizable with a compressive-sensing device as illustrated next. Sampling of tensors is achieved by using sampling matrices $U_i$, one for each tensor mode. The sampling process is implemented via a set of mode-i products denoted by $\times_i$. Specifically, the mode-i product of a tensor
$X = [x_{\partial_1}, \ldots, \partial_i, \ldots, \partial_d] \in \mathbb{R}^{N_1 \times \ldots \times N_i \times \ldots \times N_d}$ and a matrix $U = [u_{j \partial_i}] \in \mathbb{R}^{J \times N_i}$ is denoted by $X_{\times_i} U$ and is of size $N_1 \times \ldots \times J \times \ldots \times N_d$. Element-wise, the mode-i product can be written as $(X_{\times_i} U)_{\partial_1, \ldots, \partial_{i-1}, j, \partial_{i+1}, \ldots \partial_d} = \sum_{\partial_i=1}^{N_i} x_{\partial_1, \ldots, \partial_i, \ldots, \partial_d} u_{j \partial_i}$.

Without loss of generality, assume the hard sampling module performs sampling across the first two modes. Then the expression for the resulting hard samples is:

$$Y_{hard} = X_{\times_1} U_1 \times_2 U_2 \qquad (2)$$

Here, $U_1 \in \mathbb{R}^{m_r \times N_r}$ and $U_2 \in \mathbb{R}^{m_c \times N_c}$ where $m_r$ and $m_c$ are the desired number of measurements along the rows and columns, respectively, and the entries of each $U_i$'s are obtained, as usual, by sampling random distributions such as Gaussian and Bernoulli. Note that $Y_{hard} \in \mathbb{R}^{m_r \times m_c \times N_b}$ where $N_b$ is the number of bands. The sampling operation described in Eq. (2) can be implemented, for example, by forming sampling matrices $\phi_m$ via the outer product between the rows of $U_1$ and $U_2$ and sampling each band $x_i$ independently with the resulting sampling matrices as described above.

The soft sampling module 106 takes as input the hard samples $Y_{hard}$ computed by module (b) and performs sampling across the remaining tensorial mode. Since all the information about the scene required to perform soft sampling is included in $Y_{hard}$, this stage of sampling does not need to be performed with the imaging system, and, rather, may be performed using a separate processor or system. Specifically, a sampling matrix $U_3 \in \mathbb{R}^{m_b \times N_b}$, where $m_b$ is the desired number of measurements along the spectral dimension, is formed as before and the following operation is performed:

$$Y_{soft} = Y_{hard} \times_3 U_3 \quad (3)$$

Note that $Y_{soft} \in \mathbb{R}^{m_r \times m_c \times m_b}$ and that the operation from Eq. (3) can be implemented using a separate processor or system.

The compressive sensing reconstruction module 108, which takes the set of soft samples as well as the known set of sampling matrices, and reconstructs the original hyperspectral data of the scene of interest by solving a set of l1 minimization problems. Specifically, $Y_{soft}$ is unfolded. Specifically, in tensorial Mode-i fibers and Mode-i unfolding, the mode-i fiber of a tensor $X = [x_{\partial_1}, \ldots, \partial_i, \ldots, \partial_d] \in \mathbb{R}^{N_1 \times \ldots \times N_i \times \ldots \times N_d}$ is the set of vectors obtained by fixing every index but $\partial_i$. The mode-i unfolding $X_{(i)}$ of $X$ is the $N_i \times (N_1 \cdot \ldots \cdot N_{i-1} \cdot \ldots \cdot N_{i+1} \cdot \ldots \cdot N_d)$ matrix whose columns are the mode-i fibers of $X$. $Y = X \times_1 U_1 \times \ldots \times_d U_d$ is equivalent to $Y_{(i)} = U_i X_{(i)} (U_d \otimes \ldots \otimes U_{i+1} \otimes U_{i-1} \otimes \ldots \otimes U_1)^T$. Thus, $Y_{soft}$ is unfolded in mode 3 first to obtain $Y_{soft(3)} \in \mathbb{R}^{m_b \times (m_r \cdot m_c)}$ and a solution $Z_{(3)} \in \mathbb{R}^{N_b \times (m_r \cdot m_c)}$ formed by aligning solutions $z_{(3)i} \in \mathbb{R}^{N_b \times 1}$ to the set of l1 optimization problems:

$$\min_{z_{(3)i}} \|z_{(3)i}\|_1 \text{ subject to } y_{(3)i} = U_3 z_{(3)i}, \text{ for } i=1,2,\ldots,(m_r \cdot m_c), \quad (4)$$

is found via traditional l1 minimization techniques. In Eq. (4), $y_{(3)i}$ are the columns of $Y_{soft(3)}$ and $z_{(3)i}$ are the columns of $Z_{(3)}$. Let $Z \in \mathbb{R}^{m_r \times m_c \times N_b}$ denote the tensor whose mode-3 unfolding is $Z_{(3)}$.

In one embodiment, where serial joint tensorial reconstruction is implemented, $Z$ is unfolded in mode 2 to obtain $Z_{(2)} \in \mathbb{R}^{m_c \times (m_r \cdot N_b)}$ and a solution $W_{(2)} \in \mathbb{R}^{N_c \times (m_r \cdot N_b)}$ formed by aligning solutions $W_{(2)i} \in \mathbb{R}^{N_c \times 1}$ to the set of l1 optimization problems:

$$\min_{w_{(2)i}} \|w_{(2)i}\|_1 \text{ subject to } z_{(2)i} = U_2 w_{(2)i}, \text{ for } i=1,2,r(m_r \cdot N_b), \quad (5)$$

which is found via traditional l1 minimization techniques. In Eq. (5), $z_{(2)i}$ are the columns of $Z_{(2)}$ and $w_{(2)i}$ are the columns of $W_{(2)}$. Let $W \in \mathbb{R}^{m_r \times N_c \times N_b}$ denote the tensor whose mode-2 unfolding is $W_{(2)}$.

Similarly, unfold $W$ in mode 1 to obtain $W_{(1)} \in \mathbb{R}^{m_r \times (N_c \cdot N_b)}$ and a solution $V_{(1)} \in \mathbb{R}^{N_r \times (N_c \cdot N_b)}$ formed by aligning solutions $V_{(1)i} \in \mathbb{R}^{N_r \times 1}$ to the set of l1 optimization problems:

$$\min_{v_{(1)i}} \|v_{(1)i}\|_1 \text{ subject to } v_{(1)i} = U_1 w_{(1)i}, \text{ for } i=1,2,r(N_c \cdot N_b), \quad (6)$$

which is again found via traditional l1 minimization techniques. In Eq. (6), $w_{(1)i}$ are the columns of $W_{(1)}$ and $v_{(1)i}$ are the columns of $V_{(1)}$. Let $V \in \mathbb{R}^{N_r \times N_c \times N_b}$ denote the tensor whose mode-1 unfolding is $V_{(1)}$. Then $V$ is the reconstructed tensor.

In another embodiment, where parallelizable joint tensorial reconstruction is implemented, each mode is reconstructed independently following a tensorial decomposition of $Z$ according to the teachings of Li et al in "Generalized tensor compressive sensing," published in the proceedings of the 2013 *IEEE International Conference on Multimedia and Expo (ICME)*, vol., no., pp. 1-6, 15-19 July 2013.

In yet another embodiment, where vectorial reconstruction is implemented, a vectorized version of tensor $V$ is reconstructed by applying traditional l1 minimization techniques to the vectorized version $Z_{vect}$ of $Z$ according to traditional compressive sensing techniques, that is, by solving $\min_{Z_{vect}} \|Z_{vect}\|_1$ subject to $V_{vect} = \phi Z_{vect}$, where $\phi = U_1 \otimes U_2$ and $V_{vect}$ is the vectorized version of $V$.

Therefore, the systems and methods herein provide an improvement over the naëve approach that reconstructs each band independently because the systems and methods herein exploit sparsity along the spectral band as well, thus resulting in more efficient reconstruction (both in terms of reconstruction quality and, particularly in terms of reconstruction time). Further, the systems and methods herein can be implemented beyond simulation environments on hyperspectral compressive-sensing devices because the systems and methods herein address the requirements imposed for data availability that cannot be satisfied by traditional devices. More specifically, the systems and methods herein provide a hybrid approach of physical (hard) vs. external processing (soft) data sampling, which, substantially improves efficiency by removing excessive processing overhead from the imaging system.

Figure 2:
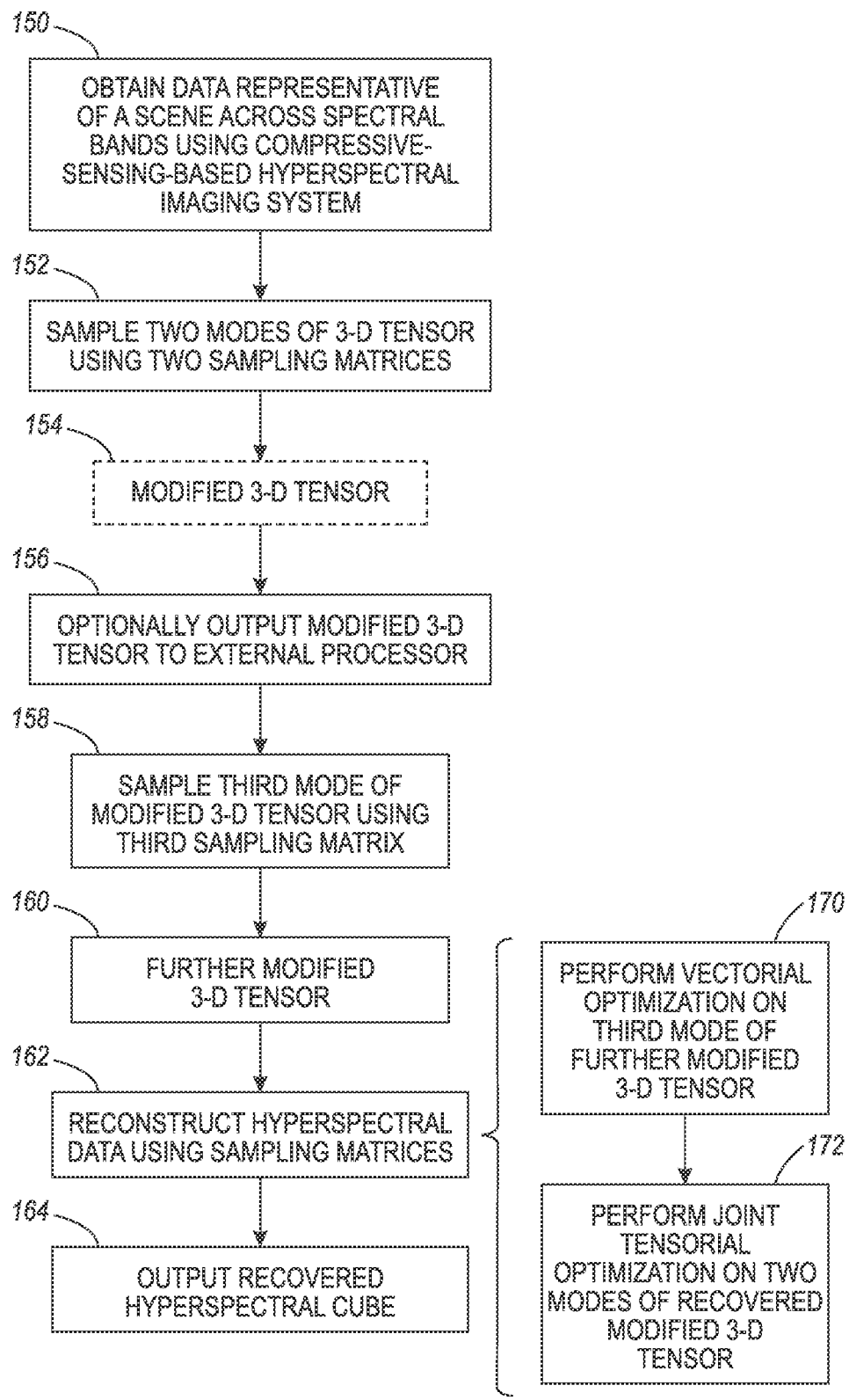
FIG. 2 is a flow diagram of various methods herein.

FIG. 2 is a flowchart illustrating exemplary methods herein. In item 150, these methods obtain data representative of a scene across spectral bands using a compressive-sensing-based hyperspectral imaging system. The imaging system has optical elements and a special-purpose image processor. In item 152, these methods sample two modes of a three-dimensional tensor corresponding to a hyperspectral representation of the scene using the same or different sampling matrices, one for each of the two modes, to generate a modified three-dimensional tensor (shown as item 154). With such methods, the process of sampling the two modes in item 152 is performed by measuring light intensity, and resulting samples are represented by digital data.

All processing shown in FIG. 2 can be performed by the imaging processor of the compressive-sensing-based hyperspectral imaging system. However, in order to reduce the processing load on the imaging processor of compressive-sensing-based hyperspectral imaging system, the modified three-dimensional tensor 154 can be output to an external processor that is separate from, but operatively connected to, the imaging processor of the compressive-sensing-based hyperspectral imaging system, as shown by box 158 (that is shown using dashed lines to represent optional processing). If this optional processing is performed in item 158, all remaining processing (160-172) is performed by the external processor, and if not, all such processing is performed by the imaging processor.

After sampling the two modes in item 152, in item 156, these exemplary methods sample a third mode of the modified three-dimensional tensor using a third sampling matrix to generate a further modified three-dimensional tensor (shown as item 160). These methods sample the third mode in item 156 by processing the digital data produced by sampling the first two modes in item 152.

Then, in item 162, these methods can reconstruct hyperspectral data from the further modified three-dimensional tensor using the same three matrices used for the three modes (the sampling matrices and the third sampling matrix). The reconstructed hyperspectral cube is then output in item 164. More specifically, when reconstructing the hyperspectral data in item 162, such methods recover each mode of the three-dimensional tensor via a sequence of optimization processing in the reverse order that the two modes and the third mode were sampled, as shown by items 170-172.

When processing reconstruction in the reverse order, these methods perform a sequence that first applies an optimization process (170) to the further modified three-dimensional tensor to reconstruct the modified three-dimensional tensor as a recovered modified three-dimensional tensor. More specifically, the processing in item 170 applies the optimization process to the further modified three-dimensional tensor, by performing vectorial optimization on the third mode of the further modified three-dimensional tensor.

Next, after performing vectorial optimization on the third mode of the recovered modified three-dimensional tensor (when processing reconstruction in the reverse order) these methods apply an optimization process to the recovered modified three-dimensional tensor to reconstruct the three-dimensional tensor corresponding to the hyperspectral representation of the scene (172). More specifically, in item 172, these methods apply the optimization process to the recovered modified three-dimensional tensor by performing joint tensorial, e.g., parallelizable or serial, or a single vectorial optimization on two modes of the recovered modified three-dimensional tensor.

Figure 3:
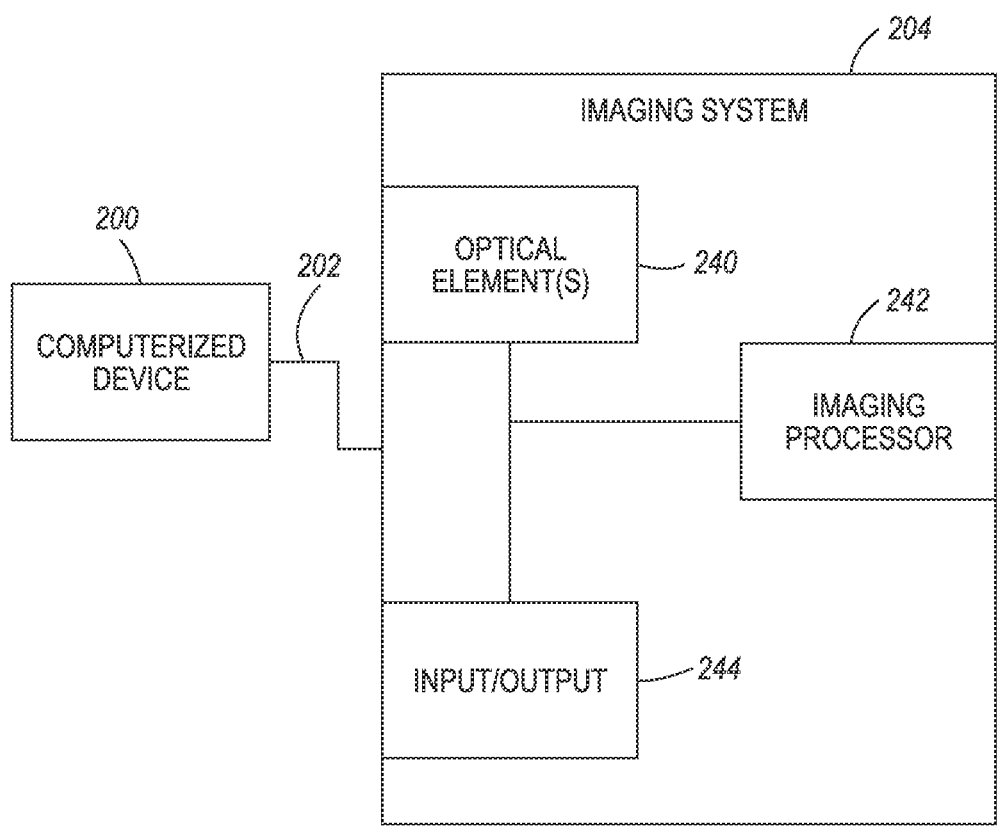
FIG. 3 is a schematic diagram illustrating systems herein.
Figure 4:
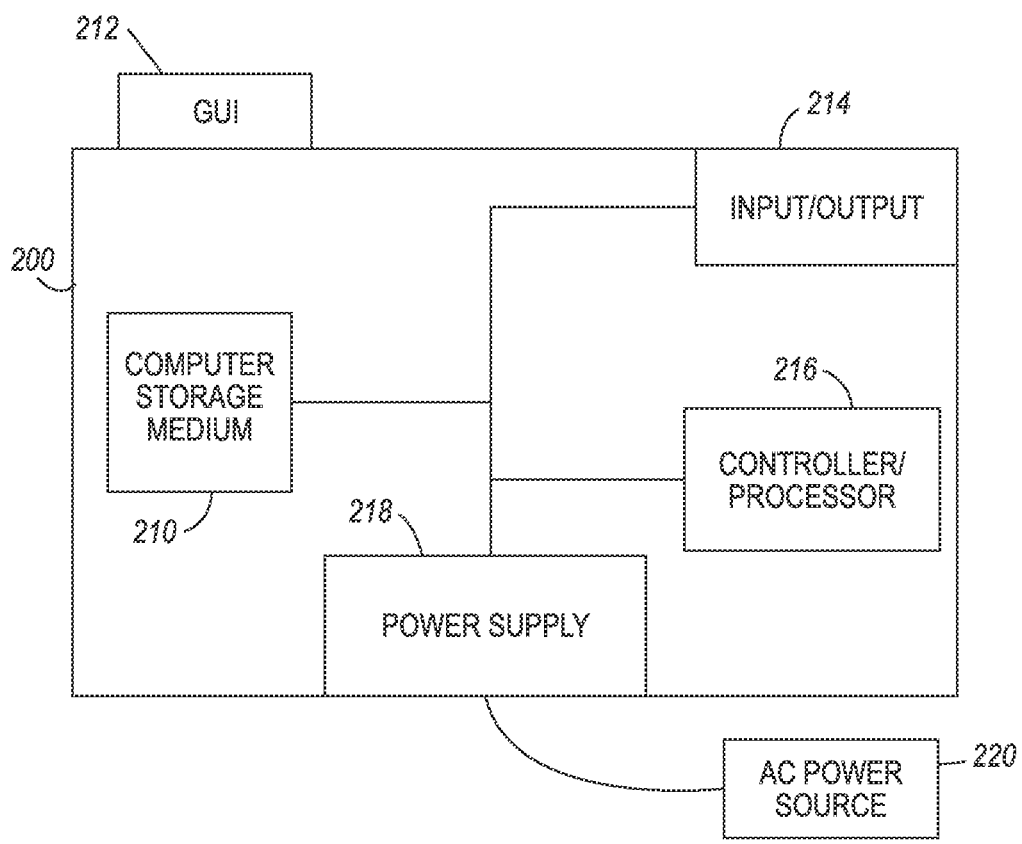
FIG. 4 is a schematic diagram illustrating devices herein.

FIG. 3 illustrates some elements of various exemplary systems herein that can include, among other components, an imaging system 204, such as a compressive-sensing-based hyperspectral imaging system 204, and a processing device 200 (having an external processor 216, as shown in FIG. 4) separate from and operatively (meaning directly or indirectly) connected to the compressive-sensing-based hyperspectral imaging system 204 by a network 202.

The compressive-sensing-based hyperspectral imaging system 204 can comprise, for example, at least one optical element 240 obtaining image data of an item, and an imaging processor 242 operatively connected to the sensor. As noted above, the element(s) 240 can be single-pixel or multi-pixel sensors and can include various filters, mirrors, lenses, etc. For example, the optical elements 240 can be an ultraviolet (UV) or visible wavelength elements, can be capable of sensing the visible and near infrared (VISNIR) wavelengths, near infrared (NIR) wavelengths, short wavelength infrared (SWIR) wavelengths, the medium wavelength infrared (MWIR) wavelengths, the long wavelength infrared (LWIR), etc.

Further, the imaging processor 242 is a specialized machine that is different from a general-purpose computer or processor because the imaging processor 242 includes special components directed to image processing. For example, the imaging processor includes application specific integrated circuits (ASIC's) dedicated to image processing, includes special optical processing boards, special optical processing filters, various input/output busses sized to optimally process optical data, etc. The compressive-sensing-based hyperspectral imaging system 204 samples two modes (or two dimensions) of a three-dimensional tensor from the image data (e.g., using the same or a different sampling matrix for each dimension of the two dimensions). The compressive-sensing-based hyperspectral imaging system 204 outputs the two modes (dimensions) to the processing device 200.

The compressive-sensing-based hyperspectral imaging system 204 samples the first two modes (two dimensions) of a three-dimensional tensor corresponding to a hyperspectral representation of the scene using the same or different sampling matrices, one matrix for each of the two modes, to generate a modified three-dimensional tensor. As noted above, in some situations, the special-purpose image processor 242 can output the modified three-dimensional tensor to the external processor 216. More specifically, all processing shown in FIG. 2 can be performed by the imaging processor 242. However, in order to reduce the processing load on the imaging processor 242, the modified three-dimensional tensor 154 can be output to an external processor 216 that is separate from, but operatively connected to, the imaging processor 242.

Thus, after the compressive-sensing-based hyperspectral imaging system 204 samples two modes, the external processor 216 (or the special-purpose image processor 242, if the modified three-dimensional tensor is not output) samples a third mode (third dimension) of the modified three-dimensional tensor using a third sampling matrix (that is the same or different from the other two matrices used to sample the first two modes) to generate a further modified three-dimensional tensor. The compressive-sensing-based hyperspectral imaging system 204 samples the two modes by measuring light intensity, and resulting samples are represented by digital data. The external processor 216 (or the special-purpose image processor 242) samples the third mode by processing the digital data produced by sampling the first two modes.

The external processor 216 (or the special-purpose image processor 242) then reconstructs hyperspectral data from the further modified three-dimensional tensor using the same three matrices used for the three modes (the first two sampling matrices and the third sampling matrix). The external processor 216 reconstructs hyperspectral data by recovering each mode of the three-dimensional tensor via a sequence of optimization processing performed in the reverse order of the sampling of the two modes and the third mode.

Again, this reverse order sequence applies an optimization process to the further modified three-dimensional tensor to reconstruct the modified three-dimensional tensor as a recovered modified three-dimensional tensor (by performing vectorial optimization on the third mode of the further modified three-dimensional tensor); and then applies a different optimization process to the recovered modified three-dimensional tensor to reconstruct the three-dimensional tensor corresponding to the hyperspectral representation of the scene (by performing joint tensorial, e.g., parallelizable or serial, or a single vectorial optimization on the two modes of the recovered modified three-dimensional tensor).

FIG. 4 illustrates details of the computerized device 200, which can be used with systems and methods herein and can comprise, for example, a server, a personal computer, a portable computing device, etc. The computerized device 200 includes a general-purpose controller/tangible processor 216 (that is different than the special-purpose imaging processor 242) and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 4, a body housing has one or more functional components that operate on power supplied from an alternating current (AC) source 220 by the power supply 218. The power supply 218 can comprise a common power conversion unit, power storage element (e.g., a battery, etc.), etc.

Figure 5:
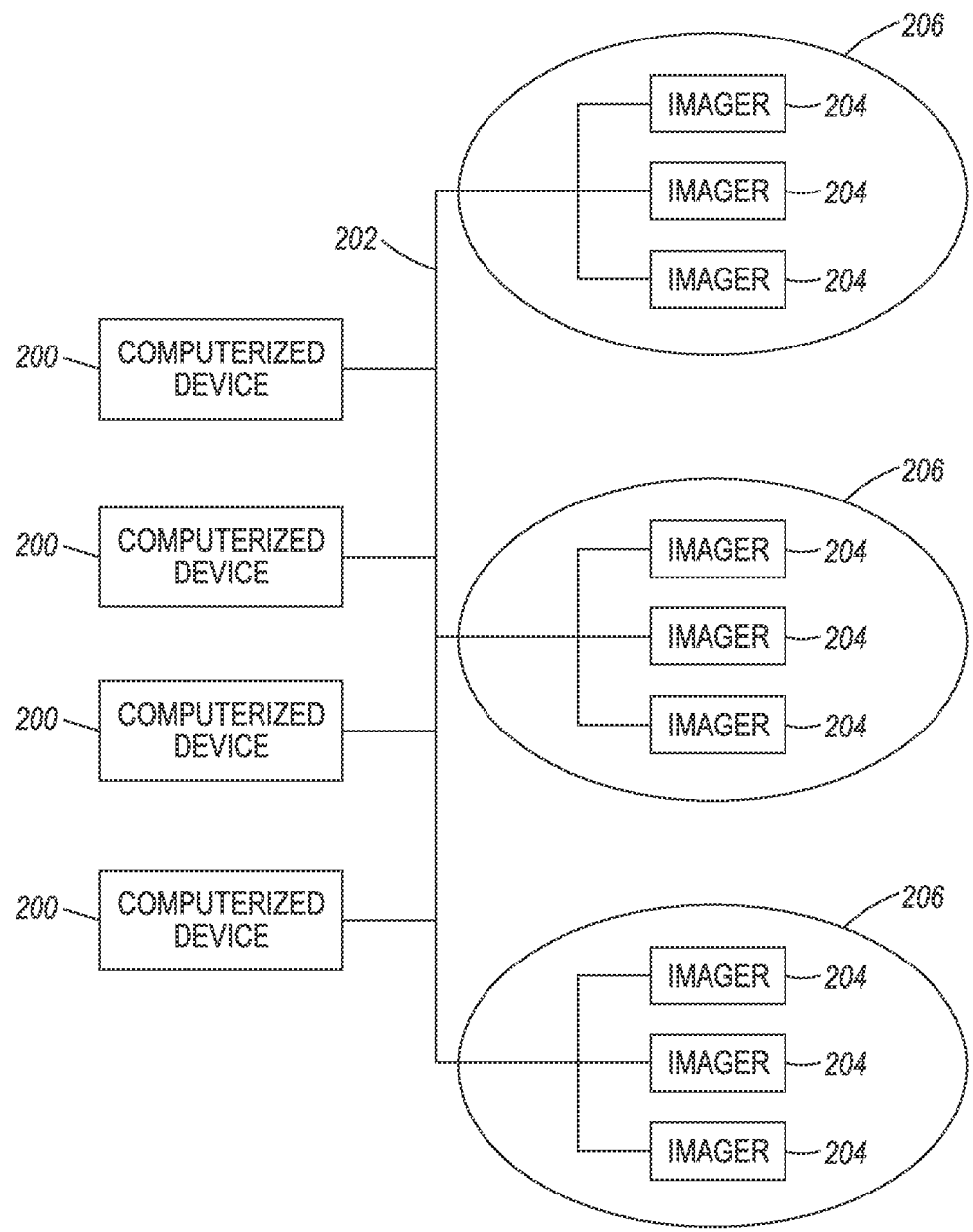
FIG. 5 is a schematic diagram illustrating systems herein.

As shown in FIG. 5, exemplary systems and methods herein include various computerized devices 200 and imaging systems 204 located at various different physical locations 206. The computerized devices 200 and imaging systems 204 are in communication (operatively connected to one another) by way of a local or wide area (wired or wireless) network 202.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    obtaining data representative of a scene across spectral bands using a compressive-sensing-based hyperspectral imaging system comprising optical elements;
    sampling two modes of a three-dimensional tensor corresponding to a hyperspectral representation of said scene using sampling matrices, one for each of said two modes, to generate a modified three-dimensional tensor;
    after said sampling two modes, sampling a third mode of said modified three-dimensional tensor using a third sampling matrix to generate a further modified three-dimensional tensor; and
    reconstructing hyperspectral data from said further modified three-dimensional tensor using said sampling matrices and said third sampling matrix,
    said reconstructing comprising recovering each mode of said three-dimensional tensor via a sequence of optimization processing in a reverse order of said sampling two modes and said sampling a third mode, said sequence comprising:
    applying an optimization process to said further modified three-dimensional tensor to reconstruct said modified three-dimensional tensor as a recovered modified three-dimensional tensor; and
    applying an optimization process to said recovered modified three-dimensional tensor to reconstruct said three-dimensional tensor corresponding to said data representative of said scene.

2. The method according to claim 1, said applying an optimization process to said further modified three-dimensional tensor comprising performing vectorial optimization on said third mode of said further modified three-dimensional tensor, and said applying an optimization process to said recovered modified three-dimensional tensor comprising performing joint tensorial optimization on said two modes of said recovered modified three-dimensional tensor.

3. The method according to claim 2, said joint tensorial optimization being one of parallelizable joint tensorial optimization and serial joint tensorial optimization.

4. A method comprising:
obtaining data representative of a scene across spectral bands using a compressive-sensing-based hyperspectral imaging system comprising optical elements;
sampling two modes of a three-dimensional tensor corresponding to a hyperspectral representation of said scene using sampling matrices, one for each of said two modes, to generate a modified three-dimensional tensor;
after said sampling two modes, sampling a third mode of said modified three-dimensional tensor using a third sampling matrix to generate a further modified three-dimensional tensor; and
reconstructing hyperspectral data from said further modified three-dimensional tensor using said sampling matrices and said third sampling matrix,
said sampling two modes of a three-dimensional tensor being performed by measuring light intensity, resulting samples being represented by digital data, and said sampling a third mode of said modified three-dimensional tensor being performed by processing said digital data.

5. A method comprising:
obtaining data representative of a scene across spectral bands using a compressive-sensing-based hyperspectral imaging system comprising optical elements;
sampling two modes of a three-dimensional tensor corresponding to a hyperspectral representation of said scene using said compressive-sensing-based hyperspectral imaging system, to generate a modified three-dimensional tensor;
after said sampling two modes, sampling a third mode of said modified three-dimensional tensor using an external processor separate from said compressive-sensing-based hyperspectral imaging system to generate a further modified three-dimensional tensor; and
reconstructing hyperspectral data from said further modified three-dimensional tensor using said external processor,
said reconstructing comprising recovering each mode of said three-dimensional tensor via a sequence of optimization processing in a reverse order of said sampling two modes and said sampling a third mode, said sequence comprising:
applying an optimization process to said further modified three-dimensional tensor to reconstruct said modified three-dimensional tensor as a recovered modified three-dimensional tensor; and
applying an optimization process to said recovered modified three-dimensional tensor to reconstruct said three-dimensional tensor corresponding to said data representative of said scene.

6. The method according to claim 5, said applying an optimization process to said further modified three-dimensional tensor comprising performing vectorial optimization on said third mode of said further modified three-dimensional tensor, and said applying an optimization process to said recovered modified three-dimensional tensor comprising performing joint tensorial optimization on said two modes of said recovered modified three-dimensional tensor.

7. A method comprising:
obtaining data representative of a scene across spectral bands using a compressive-sensing-based hyperspectral imaging system comprising optical elements;
sampling two modes of a three-dimensional tensor corresponding to a hyperspectral representation of said scene using said compressive-sensing-based hyperspectral imaging system, to generate a modified three-dimensional tensor;
after said sampling two modes, sampling a third mode of said modified three-dimensional tensor using an external processor separate from said compressive-sensing-based hyperspectral imaging system to generate a further modified three-dimensional tensor; and
reconstructing hyperspectral data from said further modified three-dimensional tensor using said external processor,
said sampling two modes of a three-dimensional tensor being performed by measuring light intensity, and resulting samples being represented by digital data.

8. The method according to claim 7, said sampling a third mode of said modified three-dimensional tensor being performed by processing said digital data.

9. A system comprising:
a compressive-sensing-based hyperspectral imaging system comprising:
optical elements obtaining data representative of a scene; and
a image processor operatively connected to said optical elements,
said compressive-sensing-based hyperspectral imaging system sampling two modes of a three-dimensional tensor corresponding to a hyperspectral representation of said scene using sampling matrices, one for each of said two modes, to generate a modified three-dimensional tensor,
said image processor sampling a third mode of said modified three-dimensional tensor using a third sampling matrix to generate a further modified three-dimensional tensor after said compressive-sensing-based hyperspectral imaging system performs said sampling two modes, and
said image processor reconstructing hyperspectral data from said further modified three-dimensional tensor using said sampling matrices and said third sampling matrix,
said image processor reconstructing hyperspectral data by recovering each mode of said three-dimensional tensor via a sequence of optimization processing in a reverse order of said sampling two modes and said sampling a third mode, said sequence comprising:
applying an optimization process to said further modified three-dimensional tensor to reconstruct said modified three-dimensional tensor as a recovered modified three-dimensional tensor; and
applying an optimization process to said recovered modified three-dimensional tensor to reconstruct said three-dimensional tensor corresponding to said data representative of said scene.

10. The system according to claim 9, said applying an optimization process to said further modified three-dimensional tensor comprising performing vectorial optimization on said third mode of said further modified three-dimensional tensor, and said applying an optimization process to said recovered modified three-dimensional tensor comprising performing joint tensorial optimization on said two modes of said recovered modified three-dimensional tensor.

11. A system comprising:
a compressive-sensing-based hyperspectral imaging system comprising:
    optical elements obtaining data representative of a scene; and
    a image processor operatively connected to said optical elements,
said compressive-sensing-based hyperspectral imaging system sampling two modes of a three-dimensional tensor corresponding to a hyperspectral representation of said scene using sampling matrices, one for each of said two modes, to generate a modified three-dimensional tensor,
said image processor sampling a third mode of said modified three-dimensional tensor using a third sampling matrix to generate a further modified three-dimensional tensor after said compressive-sensing-based hyperspectral imaging system performs said sampling two modes, and
said image processor reconstructing hyperspectral data from said further modified three-dimensional tensor using said sampling matrices and said third sampling matrix,
said compressive-sensing-based hyperspectral imaging system sampling said two modes by measuring light intensity, and resulting samples being represented by digital data.

12. The system according to claim 11, said image processor sampling said third mode by processing said digital data.

13. A system comprising:
a compressive-sensing-based hyperspectral imaging system comprising optical elements obtaining data representative of a scene, and a image processor; and
an external processor separate from and operatively connected to said compressive-sensing-based hyperspectral imaging system,
said compressive-sensing-based hyperspectral imaging system sampling two modes of a three-dimensional tensor corresponding to a hyperspectral representation of said scene to generate a modified three-dimensional tensor;
said image processor outputting said modified three-dimensional tensor to said external processor;
said external processor sampling a third mode of said modified three-dimensional tensor to generate a further modified three-dimensional tensor after said compressive-sensing-based hyperspectral imaging system performs said sampling two modes; and
said external processor reconstructing hyperspectral data from said further modified three-dimensional tensor,
said external processor reconstructing hyperspectral data by recovering each mode of said three-dimensional tensor via a sequence of optimization processing in a reverse order of said sampling two modes and said sampling a third mode, said sequence comprising:
applying an optimization process to said further modified three-dimensional tensor to reconstruct said modified three-dimensional tensor as a recovered modified three-dimensional tensor; and
applying an optimization process to said recovered modified three-dimensional tensor to reconstruct said three-dimensional tensor corresponding to said data representative of said scene.

14. The system according to claim 13, said applying an optimization process to said further modified three-dimensional tensor comprising performing vectorial optimization on said third mode of said further modified three-dimensional tensor, and said applying an optimization process to said recovered modified three-dimensional tensor comprising performing joint tensorial optimization on said two modes of said recovered modified three-dimensional tensor.

15. The system according to claim 14, said joint tensorial optimization being one of parallelizable joint tensorial optimization and serial joint tensorial optimization.

16. A system comprising:
a compressive-sensing-based hyperspectral imaging system comprising optical elements obtaining data representative of a scene, and a image processor; and
an external processor separate from and operatively connected to said compressive-sensing-based hyperspectral imaging system,
said compressive-sensing-based hyperspectral imaging system sampling two modes of a three-dimensional tensor corresponding to a hyperspectral representation of said scene to generate a modified three-dimensional tensor;
said image processor outputting said modified three-dimensional tensor to said external processor;
said external processor sampling a third mode of said modified three-dimensional tensor to generate a further modified three-dimensional tensor after said compressive-sensing-based hyperspectral imaging system performs said sampling two modes; and
said external processor reconstructing hyperspectral data from said further modified three-dimensional tensor,
said compressive-sensing-based hyperspectral imaging system sampling said two modes by measuring light intensity, resulting samples being represented by digital data, and said external processor sampling said third mode by processing said digital data.

\* \* \* \* \*